April 9, 1968     R. P. VINCENT     3,376,742

OCEAN CURRENT MEASURING DEVICE

Filed May 31, 1966

RENIC P. VINCENT
INVENTOR.

BY *John D. Gassett*

ATTORNEY.

United States Patent Office 3,376,742
Patented Apr. 9, 1968

3,376,742
OCEAN CURRENT MEASURING DEVICE
Renic P. Vincent, Tulsa, Okla., assignor to Pan American Petroleum Corporation, Tulsa, Okla., a corporation of Delaware
Filed May 31, 1966, Ser. No. 553,974
8 Claims. (Cl. 73—170)

ABSTRACT OF THE DISCLOSURE

This invention covers an apparatus for measuring the velocity of currents of water, particularly those far below the surface. A container enclosing a pendulum is suspended through a hinge joint to a flexible line which extends to a boat deck at the surface. A rudder is placed on the upper side of the hinge joint for orienting the container in the direction of the current flow. The container has two ports, one positioned in line with the arc of the pendulum. This latter port is connected through a conduit to an air supply at the surface. The other port is connected through a conduit to the atmosphere. Currents of the water move the container off vertical and the first port moves toward the pendulum such that the backpressure in the first conduit varies as a function of the current flow.

---

This invention relates to an apparatus for measuring the velocity of currents of water. It relates especially to the measuring of currents of water found far below the surface of a body of water.

Briefly in a preferred embodiment, the invention includes a water-proof elongated cylindrical container which is suspended at one end within a body of water through a hinged joint from the lower end of a flexible cable. A pendulum is pivotally supported within the container. The container and cable are suspended from a floating vessel which is supported by the body of water in which the current measurements are desired. It is known that in many bodies of water, different depths of that body of water have currents of different velocity and direction. When the container is lowered to a particular level, it will be swept or carried from a vertical position by the force of the current. On the other hand, if there is no current, i.e., the water is still, the elongated container will hang with its axis vertically. The amount of any displacement from vertical of the container is a function of the velocity of the current at that level. The pendulum, being in the container, is not affected by the current and will tend to stay in a vertical position. In accordance with this invention, indicating means are provided to indicate, on the ship, the relative position of the pendulum and the container. This indication is thus a measure of the velocity of the current at the depth of the container.

In the past, knowledge of the direction and velocity of currents deep within the ocean or ocean bays was considered by most to be largely a matter of academic interest. However, more recently the matter has taken on a more urgent aspect. One of the factors which has brought this on is the drilling for oil and gas in marine locations. In such areas, oil and gas wells have been drilled in depths of water up to 600 or more feet, and the depth of the water in which new wells are being drilled is steadily increasing. When the marine oil wells are completed as producers it is necessary to transport the produced oil to land. One of the more desirable ways of doing this is by the use of pipelines. When this is done, the pipelines are usually laid along the bottom of the body of water from the wells to a land terminal or to a central gathering point when the oil is loaded onto a floating vessel. The design problems for the platforms for supporting the drilling equipment and well completion equipment, and for designing the pipelines is very difficult. One of the more difficult problems involves forces on the platforms and on the pipelines caused by currents of water. Indeed, such currents have caused many costly failures. One of the causes of the failures is improper design which has been brought about because of lack of knowledge of the true ocean currents at the depth where the failure occurred. It is thus seen that there is a need for an accurate means of determining the velocity and direction of currents where pipelines and platforms are to be laid. This invention described herein provides such an apparatus.

Figure 1:
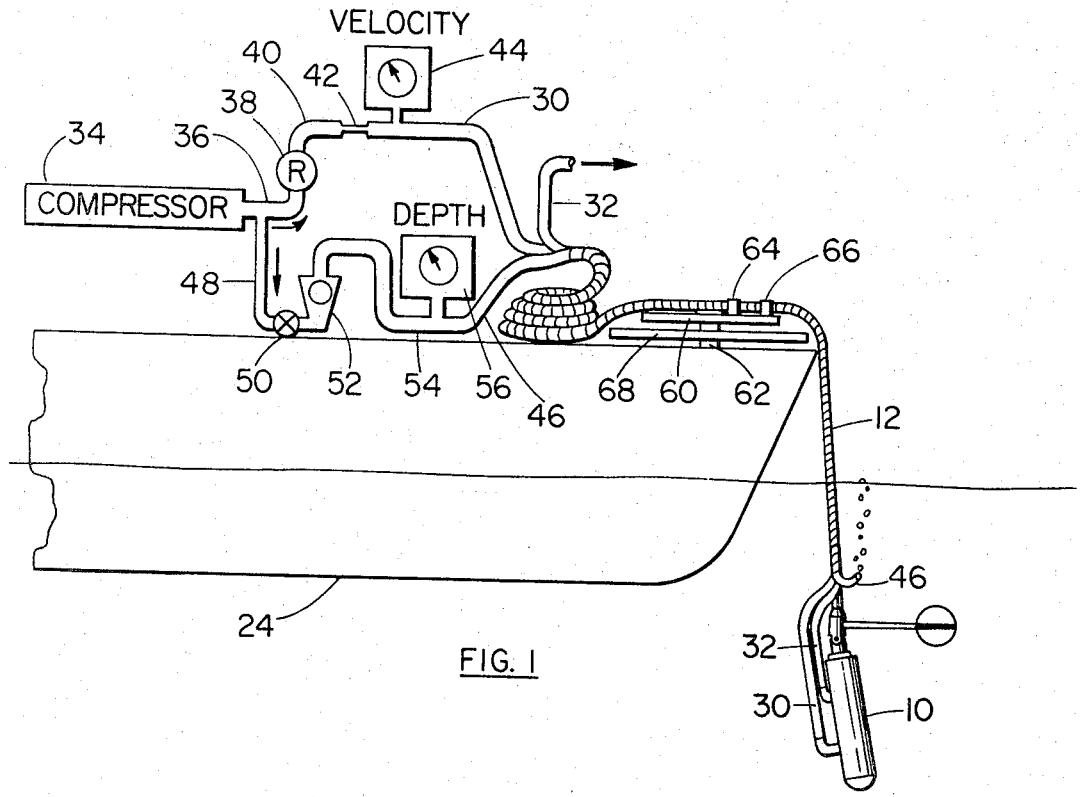
FIGURE 1 illustrates a preferred embodiment of an apparatus for measuring current velocity which is suspended from a floating vessel.
Figure 3:
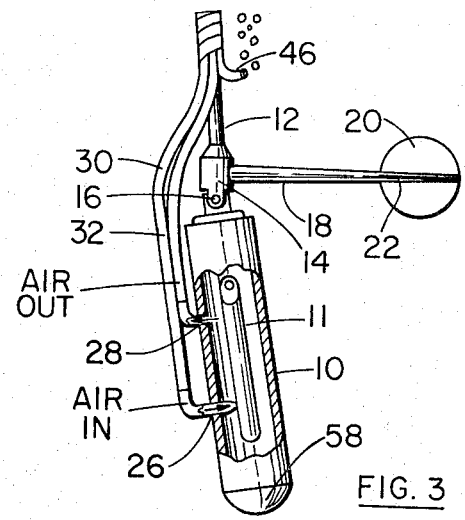
FIGURE 3 illustrates an enlarged view, partly in section, of the container and pendulum assembly of FIGURE 1.

Attention is first directed toward FIGURE 1 in which container 10 having pendulum 11 suspended therein is supported from a floating vessel 24 by flexible line 12. Container 10 is fluid-tight and is supported from line 12 by a hinged joint or horizontal axis 16. This hinged joint can comprise a universal joint as shown. Thus container 10 can pivot or rotate about axis 16. The upper section 14 of the universal joint is attached to line 12.

When the current measuring device is lowered into a body of water, it is desired that it be oriented such that axis 16 is normal to the direction of the current to prevent yawing. This is accomplished in the device by providing a horizontal vane 22 and a vertical vane 20 supported from arm 18 which is fixed to upper portion 14 of the universal joint. The vanes cause arm 18 to point in the direction of the current being measured. As arm 18 is fixed to part 14, horizontal axis 16 is automatically oriented in a direction normal to the current. This is important because it permits container 10 to be rotated about horizontal axis 16 by the current of water.

A pendulum 11 is pivotally supported within container 10. As container 10 is fluid-tight, pendulum 11 will tend to hang vertically. On the other hand, as container 10 is pivotally supported from horizontal axis 16 and is also subjected to the force of the current, it will be pivoted about axis 16 in an amount which is a function of the velocity of the current and the weight of the container itself and the distribution of the weight of the container. By properly calibrating a device, one can determine the velocity of the current of water from the inclination of the container.

As just explained, the relative position of pendulum 11 and container 10 is a function of the velocity of the current of water. Calibration can be made for a given container so that a particular inclination indicates a particular velocity. Means will now be discussed for showing a system whereby an indication is given on the surface of ship 24 of the inclination of container 10 with respect to pendulum 11. This includes a first measuring orifice 26 and a second orifice 28 in the wall of container 10. Orifice 26 is placed in container 10 on the side opposite the horizontal and vertical vanes 22 and 20. The orifice 26 is placed near the lower end of pendulum 11 so that as container 10 is driven from a vertical position, pendulum 11 causes an increased resistance to the flow of fluid through orifice 26. The resistance through orifice 26 is a function of the inclination of container 10 which as we have just seen is a function of the velocity of the water. Orifice 28 is in the upper end of container 10 and is not affected by the relative position of pendulum 11 and container 10.

Measuring orifice 26 is connected to a high pressure air source at the surface on ship 24 through a flexible conduit 30. The outlet orifice 28 is connected through a flexible conduit 32 to the atmosphere above the deck of ship 24.

A brief discussion will now be had of the air source for conduit 30 and means on the ship which shows the change of resistance through measuring orifice 26 which indicates the relative position of pendulum 11 and container 10. This includes a compressor 34 having an outlet conduit 36 which is connected to a pressure regulator 38. The outlet of regulator 38 is connected to a conduit 40 having a fixed orifice 42 therein. Pressure regulator 38 assures that the pressure in conduit 40 remains constant and orifice 42 is provided to have a constant flow of air therethrough. The outlet of orifice 42 is connected to conduit 30 which is connected to the inlet or measuring orifice 26. The pressure buildup in conduit 30 is a function of the position of pendulum 11 with relation to container 10. Thus a pressure gauge 44 is provided for conduit 30 at the surface of the ship.

The pendulum 11, the outlet orifice 26 and the case 10 are arranged so that when the case 11 is vertical, the pendulum offers no resistance to flow out through orifice 22. Thus with zero current velocity, the gauge 44 indicates only the pressure drop through the system. Angular displacement of the case 10 resulting from the flow of water will cause the pendulum 11 to exert a force against orifice 26 causing a pressure rise which will be proportional to the gravitational force acting on the pendulum. Pressure gauge 44 can be a recording type so that a continuous record of the pressure (which as we have shown is a function of the velocity) is continuously recorded. The chart on recorder 44 can be calibrated so that it reads in knots per hour.

In addition to knowing the velocity of the water at the depth of container 10, it is almost important to know the depth of container 10, it is also most important to know the depth of the container. This is accomplished in the device of FIGURE 1 as follows. A conduit 46 teminates just water. The upper end of conduit 46 is connected to an air supply so that a constant volume of air passes through such conduit 46. This includes a conduit 48 having throttling valve 50 connected to the output of compressor 34. Conduit 48 is connected to a meter such as a rotameter 52. The output of rotameter 52 is connected through a conduit 54 to conduit 46. A pressure meter 56 is connected to conduit 54 and 46. A throttling valve 50 is provided so that it can be opened to give a desired flow through flow meter 52. Then with a given flow of air, the pressure in conduit 46 is a function of the depth of its lower end. Thus by measuring the pressure by pressure meter 56 one has an indication of the depth of container 10. By proper calibration of a particular design, that is, the size, resistances, etc., of the conduit, one is able to say that a certain pressure recorded on recording meter 56 indicates a particular depth.

In designing the system, it is apparent that the larger the conduits 30, 32, and 46 are, the less resistance they have to the flow of air; but on the other hand, the slower their reaction time to changes and conditions which are to be measured by recorder 44 and recorder 56. When designing the apparatus one normally would not wish container 10 to be swept over about 45° from the vertical. This can be controlled by adding or taking weight 58 from the lower end of container 10.

For convenience, it is desired to clamp flexible conduits 30, 32 and 46 together so that the cables will not become tangled. It may be desirable to provide conduits 30 and 32 with fluid swivel connections through the universal joint connection between line 12 and container 10. It may also be desirable to have a heavy flexible steel line 12 do the actual supporting of the device and with the flexible air conduits secured to line 12.

Figure 2:
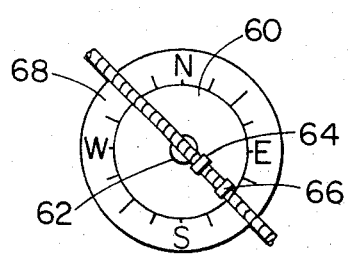
FIGURE 2 is a top view of the cable orienting means of FIGURE 1.

In addition to knowing the depth and velocity of the current of water, it is desirable to know the direction of the flow. The flow of the current on container 10 causes line 12 to become aligned with the direction of the flow of the current. Means are provided for determining this direction. Shown in FIGURE 1, a rotatable table 60 is rotatably supported from the deck of ship 24 about vertical axis 62. As shown better in FIGURE 2, the bundle of conduits in line 12 are clamped to table 60 by a first clamp 64 and a second clamp 66. These two clamps are radially aligned. As the current drags the measuring apparatus in the direction of the current, the table 60 will rotate and the two clamps 64 and 66 will become aligned with the direction of the pull. Beneath table 60 is a revolving direction finder or compass face 68. This has the various directions of a compass indicated thereon. When it is desired to know the direction of the current, one merely rotates the compass face 68 until the direction indicated as "north" is indeed pointing toward the north, as may be indicated by the ship's compass. Then one can read the alignment of clamps 66 and 64 to determine the direction of the current at the depth of the container 10. Thus I have described means for determining the depth at which container 10 is, the velocity of water at that depth, and also the direction of the current.

While the above embodiment of the invention has been described with considerable detail, it is to be understood that various modifications of the device can be made without departing from the scope or spirit of the invention.

I claim:

1. An apparatus for use in determining the velocity of currents of water which comprises:
   (a) a container;
   (b) a pendulum supported within said container;
   (c) means to support said container in a body of water, including a flexible line and a hinged joint connecting the flexible line to said container;
   (d) means to indicate the relative position of said pendulum and said container;
   (e) rudder means for orienting the container with the direction of current flow, said rudder means being connected to the side of said hinge joint away from said container.

2. An apparatus as defined in claim 1 including means for indicating depth which comprises a third conduit extending from said source of high pressure fluid to and adjacent the exterior of said container, and a pressure responsive indicating gauge in said third conduit.

3. An apparatus as defined in claim 2 including means for orienting said container in the direction of the flow of current.

4. An appartus as defined in claim 2 including recording means for recording the depth indicated by said depth indicating means and the relative position of said container and said pendulum.

5. An apparatus as defined in claim 1 including a depth indicating means comprising a third conduit extending from the surface to the exterior of said container and adjacent thereto.

6. An apparatus as defined in claim 5 in which said first, second and third conduits are secured together; and which apparatus includes a revolvable horizontal support table having clamping means for clamping said conduits to the face of said revolvable table, said clamps being spaced so that a portion of said flexible conduits between said clamps extend radially with respect to said table and point in the direction of the flow of the current at the depth of said container; and a rotatable direction finding means supported on the same vertical axis as said rotatable support table so that the direction of the current can be readily determined by properly orienting the direction finding means with north.

7. An apparatus for use in determining the velocity of currents of water which comprises:
   (a) a container;
   (b) a pendulum supported within said container;
   (c) means to support said container in a body of water;
   (d) means to indicate the relative position of said pendulum in said container supported by a vessel floating on a body of water and includes a first orifice in the wall of said container and spaced where movement of said pendulum varies the resistance of flow through said first orifice; a second orifice in the wall of said container and spaced from said first orifice; a first flexible conduit extending from the surface of the water to said first oriffice; a second conduit extending from said second orifice to above the surface of water, said first conduit and said second conduit being in fluid-tight relationship with the exterior of said first and said second orifice; and a source of high pressure fluid connected to said first conduit.

8. An apparatus for use in determining the velocity of currents of water which comprises:

(a) a container;
(b) a pendulum supported within said container;
(c) means to support said container in a body of water;
(d) means to indicate the relative position of said pendulum and said container;
(e) means for indicating the depth of said container.

References Cited

UNITED STATES PATENTS

| | | | |
|---|---|---|---|
| 1,055,153 | 3/1913 | Ferguson. | |
| 1,730,404 | 10/1929 | Wollaston | 73—189 |
| 1,868,833 | 7/1932 | Hester | 33—205 |
| 3,203,236 | 8/1965 | Prince | 73—170 X |

RICHARD C. QUEISSER, *Primary Examiner.*

JERRY W. MYRACLE, *Assistant Examiner.*

UNITED STATES PATENT OFFICE
CERTIFICATE OF CORRECTION

Patent No. 3,376,742             April 9, 1968

Renic P. Vincent

It is certified that error appears in the above identified patent and that said Letters Patent are hereby corrected as shown below:

Column 3, line 32, cancel "depth of container 10, it is almost important to know the"; line 35, "teminates" should read -- terminates --; between lines 35 and 36, insert -- above container 10 with its lower end opened into the --. Column 5, line 7, "oriffice" should read -- orifice --.

Signed and sealed this 5th day of August 1969.

(SEAL)
Attest:

Edward M. Fletcher, Jr.          WILLIAM E. SCHUYLER, JR.
Attesting Officer             Commissioner of Patents